United States Patent [19]

Hyer

[11] Patent Number: 4,991,352
[45] Date of Patent: Feb. 12, 1991

[54] DOOR GASKET WITH TRIANGULAR SHAPE

[75] Inventor: Michael L. Hyer, Weatherford, Tex.

[73] Assignee: JMK International, Inc., Fort Worth, Tex.

[21] Appl. No.: 512,025

[22] Filed: Apr. 16, 1990

Related U.S. Application Data

[63] Continuation of Ser. No. 276,118, Nov. 25, 1988, abandoned.

[51] Int. Cl.$^5$ .............................................. E06B 7/16
[52] U.S. Cl. ......................................... 49/495; 49/489; 49/491; 49/498
[58] Field of Search .................... 428/122; 49/495; 277/181

[56] References Cited

U.S. PATENT DOCUMENTS

| | | | |
|---|---|---|---|
| 1,800,008 | 4/1931 | Cronmiller et al. | 49/498 |
| 2,665,458 | 1/1954 | Wilcox | 49/491 |
| 2,710,432 | 6/1955 | Sardanik | 49/498 |
| 2,737,412 | 3/1956 | Smith et al. | 49/493 |
| 3,309,817 | 3/1967 | Fisher | 49/492 |
| 3,427,776 | 2/1969 | Lake et al. | 49/475 |
| 3,958,369 | 5/1976 | Mathellier | 49/491 |
| 4,076,262 | 2/1978 | Deventer | 277/227 |
| 4,255,903 | 3/1981 | Reynolds et al. | 49/498 |
| 4,339,052 | 7/1982 | Hills et al. | 277/12 |
| 4,381,115 | 4/1983 | Ko | 277/207 R |
| 4,508,355 | 4/1985 | Dichter | 277/189 |
| 4,538,381 | 9/1985 | Vogel | 49/479 |
| 4,619,077 | 11/1986 | Azzola et al. | 49/491 |
| 4,628,639 | 12/1986 | Lownsdale | 49/498 |
| 4,660,323 | 4/1987 | Kanies | 49/70 |
| 4,708,898 | 11/1989 | Gommier et al. | 49/498 |

FOREIGN PATENT DOCUMENTS

| | | | |
|---|---|---|---|
| 56-35863 | 4/1981 | Japan | 277/235 R |
| 647226 | 11/1948 | United Kingdom | 138/118 |

Primary Examiner—Allan N. Shoap
Assistant Examiner—Daniel G. DePumpo
Attorney, Agent, or Firm—Charles D. Gunter, Jr.

[57] ABSTRACT

A door gasket is shown for sealing between confronting surfaces. The gasket has a base for mounting to one confronting surface and a deforming section which protrudes outwardly for contacting the second surface. A wire extends through the base parallel to the axis of the gasket member. The deforming section includes a bottom wall, a vertical wall and a slanting wall which are integrally formed with the base and interconnected to define a right triangular exterior which produces improved sealing characteristics.

5 Claims, 2 Drawing Sheets

DOOR GASKET WITH TRIANGULAR SHAPE

This application is a continuation of application Ser. No. 276,118, filed Nov. 25, 1988, now abandoned.

BACKGROUND OF THE INVENTION

1. Field of the Invention.

This invention relates in general to gaskets that seal between confronting surfaces, and in particular to a gasket for sealing between the confronting surfaces of an appliance door.

2. Description of the Prior Art.

Various gasket configurations are known in the art for sealing between the confronting surfaces of oven doors, refrigerator doors, automobile doors and the like. For instance, household ovens have gaskets located between the oven door and the frame of the oven for cushioning and sealing the heat within. Many of these gaskets are formed of silicone rubber so as to resist temperature degradation and to extend the useful life of the gasket. The prior art oven door gaskets are typically comprised of straight, elongated pieces, each for one side of the oven. Usually, there are three pieces provided, one for the top, and one for each side, with the corners having small gaps between each straight piece. Normally, the pieces contain flat metal strips that extend all or part of the length of the gaskets for removably clipping the gaskets to apertures in the frame of the oven. This allows the gaskets to be removed for cleaning.

U.S. Pat. No. 4,538,381, to Vogel, issued Sept. 3, 1985, and assigned to the assignee of the present invention, shows a continuously extruded gasket with a tubular section which protrudes outwardly from a base. A ductile wire passes along the entire length of the base and allows the gasket to be bent into a rectangular shape for mounting on the oven door.

In spite of the above improvements, I have found that door gaskets of oval, round, square or rectangular cross-sectional shape tend to pucker or distort when bent, thereby forming potential leak paths due to unequal compression requirements, allowing heat to leak from the sealed enclosure. This is a particular problem for an oven door gasket formed of a continuously extruded length of material which is bent into a rectangular shape to fit the door opening.

A need exists for an improved door gasket for sealing between two confronting surfaces which can be bent into a 90° corner which does not pucker or distort in the corner to form a potential leak path.

A need also exists for such a door gasket having a profile which allows the bending distortion at the 90° corner to be absorbed in other portions of the profile than the sealing portions thereof.

A need also exists for such a door gasket which provides improved sealing characteristics at lower degrees of compression than prior art gaskets.

SUMMARY OF THE INVENTION

The door gasket of the invention is used for sealing between two confronting surfaces. An elongate gasket member of an elastomeric material has a base for mounting to the first of the confronting surfaces to be sealed. A deforming section of the gasket protrudes outwardly from the base for sealing contact with the second of the two confronting surfaces. In the preferred embodiment shown, a wire extends through the base parallel with the longitudinal axis of the gasket member. The wire is sufficiently ductile to be bent into a selected shape and has sufficient strength to retain the gasket member in the selected shape. The deforming section includes a bottom wall which is parallel to the plane of the first confronting surface. A vertical wall forms a right angle with the bottom wall and a slanting wall interconnects the bottom wall and vertical wall. The bottom, vertical and slanting walls are all integrally formed with the base and interconnected to define a right triangular exterior and a hollow interior. The slanting wall forms the hypotenuse of the right triangle and has an exterior sealing surface thereon.

Preferably, a longitudinally extending fin is located adjacent the juncture of the slanting wall and the vertical wall. The longitudinally extending fin is deformed inwardly toward the sealing surface of the gasket when the second confronting surface is brought into contact with the sealing surface to thereby form a secondary sealing surface with the first confronting surface.

Additional objects, features and advantages will be apparent in the written description which follows.

DETAILED DESCRIPTION OF THE INVENTION

Figure 5:
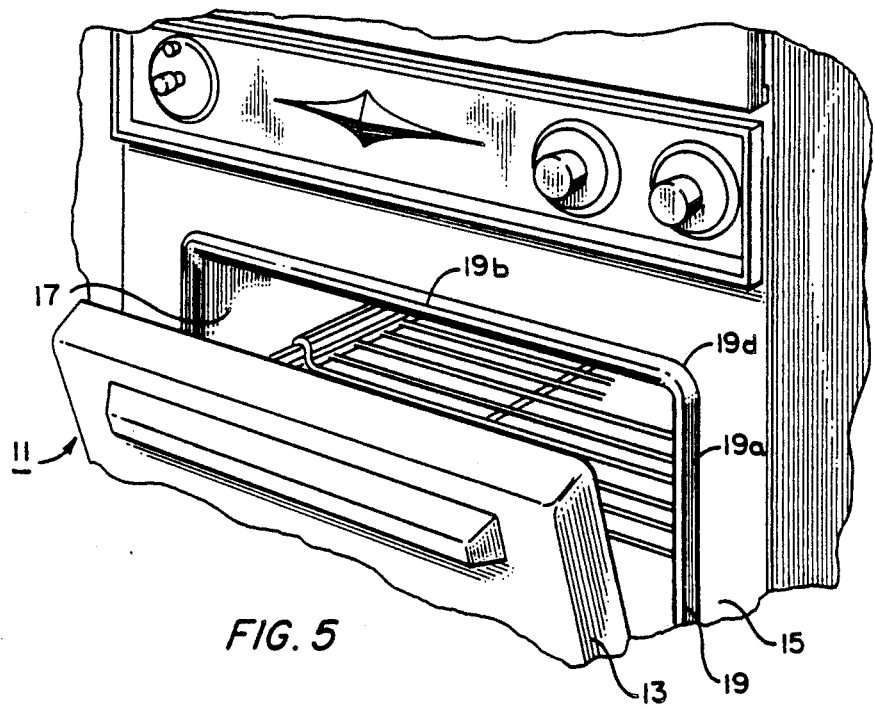
FIG. 5 is a partial, perspective view of an oven having a gasket formed in accordance with this invention.

The sealing gasket of the invention is particularly adapted to seal between the confronting surfaces of a door opening such as an oven door, refrigerator door, or automobile door. The invention can be illustrated with reference to FIG. 5 which shows a conventional oven 11 mounted within the wall of a home. Oven 11 has a door 13 which has a hinge (not shown) on its lower end for moving between an open and closed position. In the closed position, door 13 will fit flush against frame 15 and close the oven opening 17. A gasket 19 surrounds the perimeter of the opening 17 for providing a seal between the confronting surfaces of the frame 15 and the door 13. Gasket 19, as shown in FIG. 5, is in the shape of a rectangular "U", facing downwardly. Gasket 19 has two vertical sides 19a that are joined together by a horizontal top section 19b. The sides 19a each terminate in a lower end. Gasket 19 is bent into 90° corners 19d, which connect the vertical sides 19a with the horizontal top section 19b. Microwave ovens (not shown) would have gaskets that are rectangular loops with four sides and the ends abutting each other at one point.

Figure 1:
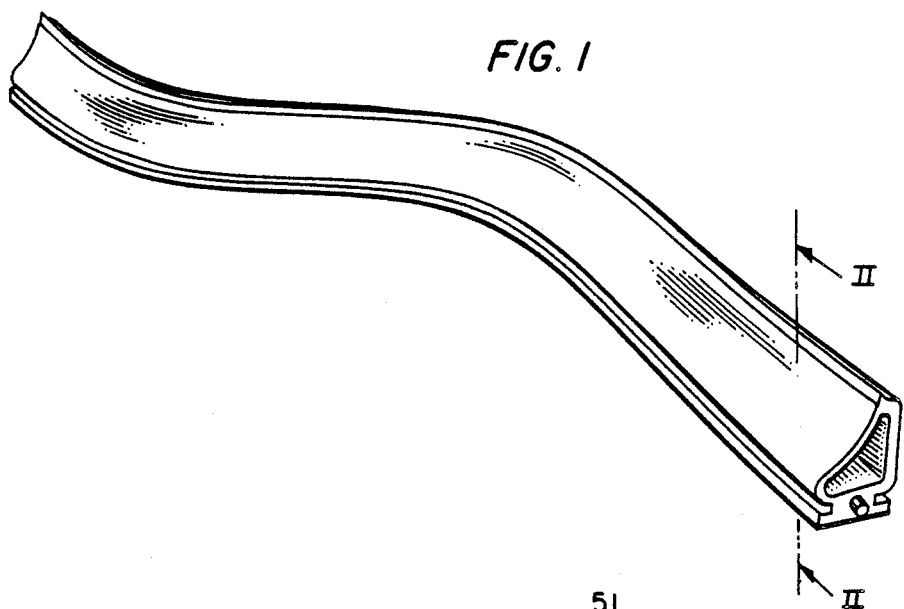
FIG. 1 is a perspective view of the gasket of the invention.
Figure 2:
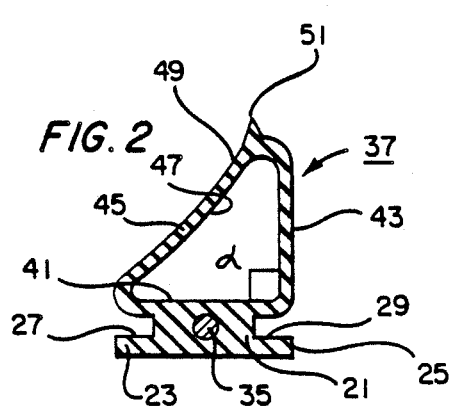
FIG. 2 is a side, cross-sectional view of the gasket of FIG. 1 taken along lines II—II.

Referring to FIGS. 1 and 2, each gasket 19 has a base 21 that extends the full length of the gasket and is of generally rectangular cross-section. In the embodiment shown, a pair of longitudinally extending ribs 23, 25 run along the base lower extent and define opposing recesses 27, 29. The recesses 27, 29 and ribs 21, 23 provide a convenient point for attaching mounting clips, in the case of an oven door opening. Alternatively, as shown in FIGS. 3 and 4, the base 21 and ribs 23, 25 can be conveniently received within the mounting track 31 of a first confronting door surface 33.

In the embodiment shown, a ductile metal wire 35, preferably single strand, extends axially through the base 21. Wire 35 is much smaller in diameter than the base 21 and extends parallel to the axis of the gasket 19. Wire 35 is sufficiently ductile so as to be easily bent by hand. Moreover, the wire should have sufficient strength so as to retain the gasket 19 in the desired configuration after bending. Wire 35 extends the full length of the gasket 19.

Figure 3:
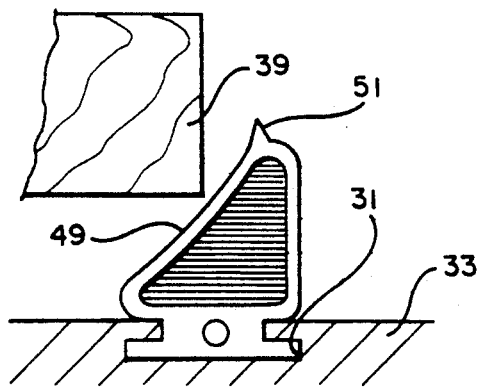
FIG. 3 is side elevational view of the gasket of the invention mounted on a first confronting door surface and prior to contacting the second confronting door surface.
Figure 4:
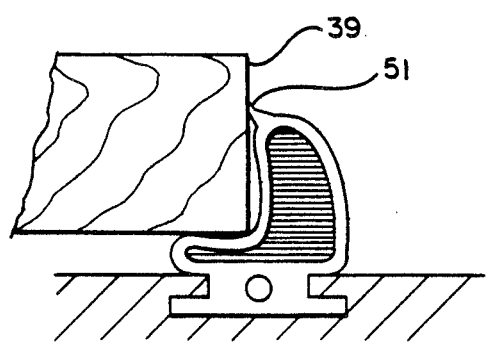
FIG. 4 is a view similar to FIG. 3 showing the operative position in which the second confronting door surface has contacted the sealing gasket of the invention.

The gasket 19 has a deforming section, designated generally as 37, which protrudes outwardly from the base 21 for sealing contact with the second of the confronting surfaces (39 in FIG. 3). The deforming section 37 includes a bottom wall 41 which is parallel to the plane of the first confronting surface 33, a vertical wall 43 which forms a right angle alpha with the bottom wall 41, and a slanting wall 45 which interconnects the bottom wall 41 and vertical wall 43. The bottom, vertical and slanting wall are all integrally formed with the base 21 and interconnected to define a right triangular exterior and a triangular, hollow interior 47. The slanting wall 45 forms the hypotenuse of the right triangle and also forms an exterior sealing surface 49 which constitutes the primary sealing surface for the confronting door surface 39. The slanting wall 45 interconnects an outermost extent of each of the vertical wall 43 and bottom wall 41 in a generally straight line, whereby the slanting wall 45 forms an uninterrupted, smoothly sloping surface between the bottom wall 41 and the vertical wall 43.

Preferably, a longitudinally extending fin 51 is located adjacent the juncture of the slanting wall 45 and the vertical wall 43. The longitudinally extending fin is generally in the shape of an equilateral triangle in cross-section and is inclined inwardly at an acute angle in the direction of the primary exterior sealing surface 49, as viewed in FIG. 2. The longitudinally extending fin 51 extends along the entire length of the gasket 19 and is deformed inwardly toward the sealing surface 49 through an arc of greater than about 90° when the second confronting surface 39 of the door is brought into contact with the primary sealing surface 49 to thereby form a secondary sealing surface, as shown in FIG. 4.

The gasket 19 is manufactured by extruding a continuous length of elastomeric material from a conventional extruder (not shown) which includes a die formed in the shape of the cross-section of the gasket. Uncured silicone rubber is fed into the extruder, which forces the material out from the extruder in the configuration shown in FIG. 1. For those embodiments having a retaining wire, a roll of wire 35 is mounted to the extruder for feeding into the extruder at the die so as to simultaneously draw the wire as the gasket 19 is being formed.

The uncured, extruded gasket 19 and wire 35 are drawn through a vulcanizer in a conventional manner, as by drawing the material along a belt. The gasket 19 will cure due to the temperature of the vulcanizer as it is drawn along the belt. Friction of the gasket 19 material on the belt will cause the wire 35 to be drawn along simultaneously. As the gasket 19 proceeds from the vulcanizer, it will be cut into desired lengths and then processed as appropriate for each application. For example, applications requiring a post cure can be accomplished by placing the material on a tray and then heating in an oven.

In the case of oven door gaskets, the sealing gasket 19 can be preformed into the rectangular shape shown in FIG. 5 by the gasket manufacturer, or the gaskets can be shipped in bulk to the oven manufacturer where they will be formed at that point. In either case, the gaskets are formed into the configuration of FIG. 5 simply by hand, or machine bending the corners 19b at the desired points. Metal clips can then be secured to the gasket base 21 and inserted into holes provided in the oven door confronting surface for mounting the gasket on the oven door as shown in FIG. 5.

Figure 6:
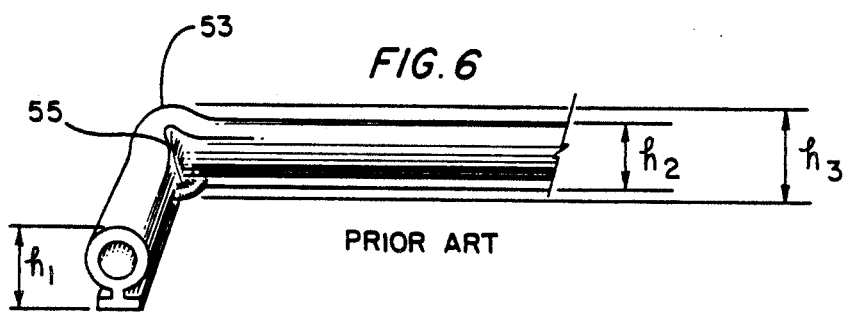
FIG. 6 is a partial, isolated view of a prior art gasket bent to form a 90° corner.
Figure 7:
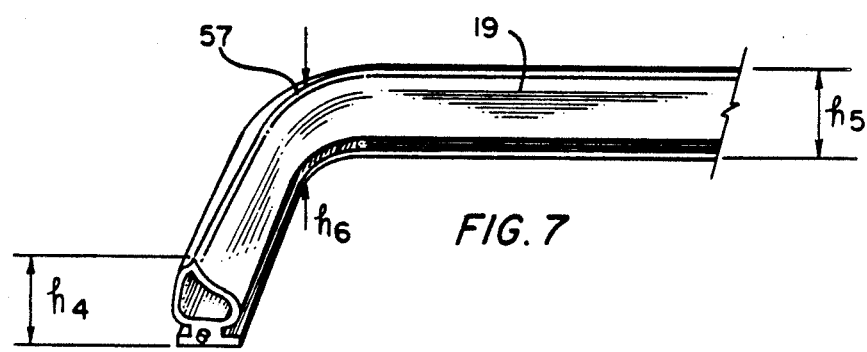
FIG. 7 is a partial, perspective view of a gasket of the invention bent to form a 90° corner.

An invention has been provided with several advantages. As shown in FIG. 6, the prior art gaskets of round, square, oval, or rectangular cross-section tended to pucker or distort in the area of the bend 53. As shown in FIG. 6, the pucker or bend area 53 assumes a greater height than the remainder of the gasket length and includes a crimp or channel region 55. Thus, the height $H_3$ is actually greater than the dimensional heights $H_1$ and $H_2$ taken along the length of the gasket apart from the bend area 53. FIG. 7 shows the gasket of the invention 19 which can be bent around a 90° turn without producing a pucker in the profile which limits the sealing characteristics of the gasket. The distortion produced by bending the gasket 19 is absorbed in other portions of the profile that do not constitute sealing portions of the profile. For example, in the embodiment shown with a bend radius of 1¼ inches, approximately 80% of the distortion is taken in the vertical wall 43 with approximately 10-20% of the distortion being taken in the slanting wall 45. As a result, the dimensional height $H_6$ at the bend area 57 is no greater than the dimensional heights $H_4$ and $H_5$ taken along the gasket apart from the bend area 57.

As a result of the above characteristics, the gasket 19 of the invention provides better sealing characteristics at lower compressions than do the prior art gaskets. Temperature readings taken on test ovens supplied with prior art gaskets and gaskets of the invention indicate a 50% reduction in heat loss characteristics when using the gasket of the invention. In actual tests, a conventional gasket produced a 221° heat loss as compared to a 140° heat loss measurement using the improved gasket design of the invention.

While the invention has been shown in only one of its forms it is not thus limited but is susceptible to various changes and modifications without departing from the spirit thereof.

I claim:

1. A door gasket for sealing between two confronting surfaces, comprising in combination:
   an elongate gasket member of elastomeric material having a length, having a base for mounting to the first of the confronting surfaces and a deforming section protruding outwardly from the base for sealing contact with the second of the surfaces;
   wherein the deforming section includes a bottom wall which is parallel to the plane of the first confronting surface, a vertical wall which forms a right angle with the bottom wall, and a slanting wall which interconnects the bottom wall and vertical wall, the bottom, vertical and slanting walls all being integrally formed with the base and interconnected to define a right triangular exterior and a hollow interior, the interconnecting of said slanting wall and said vertical wall being defined by an arcuate juncture having a first and second end portion, said first end portion merging into said slanting wall and said second end portion merging into said vertical wall, the slanting wall forming substantially the hypotenuse of the right triangle and comprising a primary exterior sealing surface for the door gasket; and wherein the door gasket further comprises a fin located on the primary exterior sealing surface of the door gasket for the length thereof and being adjacent said first end portion of said arcuate juncture of the slanting wall and vertical wall, said fin extending in a direction outwardly from said slanting wall and away from the bottom and vertical walls, the fin being deformed through an arc inwardly toward the sealing surface when the second confronting surface is brought into contact with the primary exterior sealing surface to thereby form a secondary sealing surface with the first confronting surface.

2. In an appliance having a frame with a door opening therein, the combination comprising:

a door mounted for swinging movement within the door opening provided in the frame, the door and frame having confronting surfaces respectively and a sealing means for sealing the door when closed against the frame, the sealing means including an elongate gasket member of elastomeric material having a length, having a base for mounting to a first of the confronting surfaces and a deforming section protruding outwardly from the base for sealing contact with a second of the surfaces when the door is closed;

wherein the deforming section includes a bottom wall which is parallel to the plane of the first confronting surface, a vertical wall which forms a right angle with the bottom wall, and a slanting wall which interconnects the bottom wall and vertical wall, the bottom, vertical and slanting walls all being integrally formed with the base and interconnected to define a right triangular exterior and a hollow interior, the interconnecting of said slanting wall and said vertical wall being defined by an arcuate juncture having a first and second end portion, said first end portion merging into said slanting wall and said second end portion merging into said vertical wall the slanting wall forming substantially the hypotenuse of the right triangle and comprising a primary exterior sealing surface for the gasket, the second confronting surface being arranged to contact the hypotenuse of the deforming section between the ends thereof when the door is closed; and wherein the door gasket further comprises a fin located on the primary exterior sealing surface of the door gasket for the length thereof and being adjacent said first end portion of said arcuate juncture of the slanting wall and vertical wall, said fin extending in a direction outwardly from said slanting wall and away from the bottom and vertical walls, the fin being deformed through an arc inwardly toward the sealing surface when the second confronting surface is brought into contact with the primary exterior sealing surface to thereby form a secondary sealing surface with the first confronting surface.

3. The combination of claim 2, wherein the slanting wall interconnects an outermost extent of each of said vertical and bottom walls in a straight line, whereby the slanting wall forms an uninterrupted, smoothly sloping surface between the vertical wall and the bottom wall.

4. The combination of claim 3, wherein the elongate gasket member is formed by extruding a continuous length of silicone rubber.

5. In an oven appliance having a frame with an oven door opening therein, the combination comprising:

a door mounted for swinging movement within the door opening provided in the frame;

an elongate gasket member of elastomeric material having a length, having a base mounted about the periphery of the door opening provided in the frame, the elongate gasket also having a deforming section protruding outwardly from the base for sealing contact with a contact region of the door when the door is closed;

wherein the deforming section includes a bottom wall which is parallel to the plane of the frame surface, a vertical wall which forms a right angle with the bottom wall, and a slanting wall which interconnects the bottom wall and vertical wall, the bottom, vertical and slanting walls all being integrally formed with the base and interconnected to define a right triangular exterior and a hollow interior, the interconnecting of said slanting wall and said vertical wall being defined by an arcuate juncture having a first and second end portion, said first end portion merging into said slanting wall and second end portion merging into said vertical wall, the slanting wall forming substantially the hypotenuse of the right triangle and comprising a primary exterior sealing surface for the gasket, the contact region of the door being arranged to contact the hypotenuse of the deforming section between the ends thereof when the door is closed; and wherein the elongate gasket further comprises a fin located on the primary exterior sealing surface of the door gasket for the length thereof and being adjacent said first end portion of said arcuate juncture of the slanting wall and vertical wall, said fin extending in a direction outwardly from said slanting wall and away from the bottom and vertical walls, the fin being deformed inwardly toward the sealing surface when the contact region of the door is brought into contact with the primary exterior sealing surface, whereby the longitudinally extending fin touches the contact region of the door to thereby form a secondary sealing surface.

* * * * *